Figure 1:
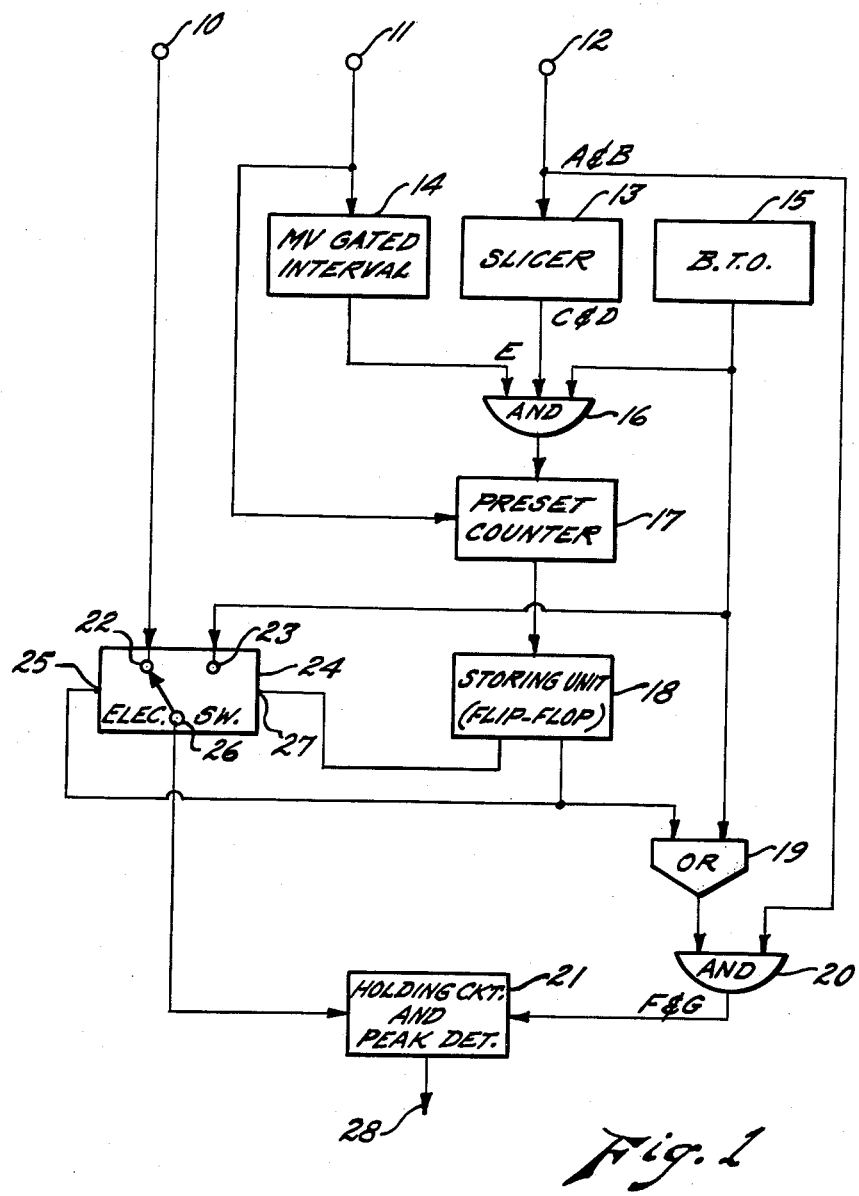

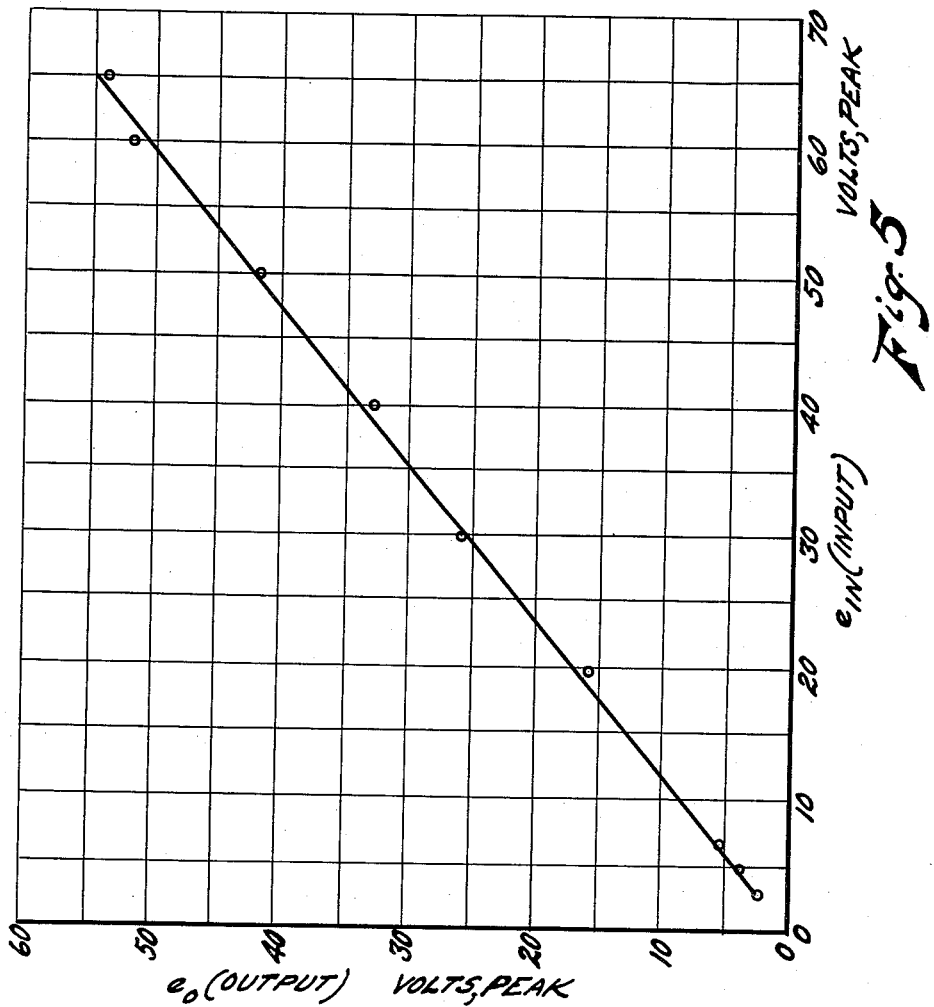
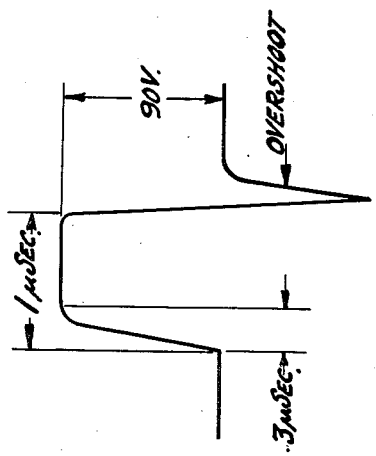

United States Patent Office 2,991,420
Patented July 4, 1961

2,991,420
CW AND PULSE AMPLITUDE MODULATION ANALYZER
Murray W. Beaver, Philadelphia, Pa., and Nathaniel C. Perry, Jr., St. Paul, Minn., assignors to the United States of America as represented by the Secretary of the Air Force
Filed Apr. 26, 1960, Ser. No. 24,859
5 Claims. (Cl. 328—13)

The present invention relates to a modulation analyzing system and more particularly to a system wherein electrical signals are analyzed to determine the presence and type of modulation thereof.

There is presently in operation a multiplicity of radar and radio systems which include electrical signals that have been continuous wave amplitude modulated or pulse modulated. It is highly desirable to analyze aforesaid signals to detect the presence or absence of CW or pulse modulation thereof. Once a determination of this nature has been accomplished, a further processing and utilization of the signals may be more efficiently made.

The present invention provides a modulation analyzer system to detect the presence or absence of CW or pulse modulation of an electrical signal. The analyzer system supplies this information in digital form. Whether the signal is CW or pulsed, the output signal from the analyzer is always a chain of pulses. In order to achieve this result CW-amplitude modulated signals are converted into pulse amplitude modulated signals at a fixed pulse rate. When the input signal is recognized as pulsed, it is passed to the output as received, but with the pulse peaks stored for a time determined by an external synchronization pulse. The synchronization pulse represents the time that the signal crosses a chosen threshold.

Still a further object of the present invention is to provide a novel modulation analyzer system for preserving the amplitude of the applied electrical signal by supplying a chain of output pulses, whose peak amplitudes are proportional to the input signal, irrespective as to whether these signals are analyzed and detected as CW or pulsed.

A further object of the present invention is to provide a modulation analyzer system to detect the presence or absence of CW or pulse modulation of electrical signals applied thereto.

Still a further object of the present invention is to provide a modulation analyzer system wherein the electrical signal applied thereto is analyzed to detect the presence or absence of CW or pulse modulation and to supply a chain of output pulses whether the input signal is CW or pulsed.

In the accompanying specification, we shall describe, and in the annexed drawings show, what is at present considered a preferred embodiment of the modulation analyzing system of our present invention. It is, however, to be clearly understood that we do not wish to be limited to the exact details herein shown and described for the purposes of illustration only, inasmuch as changes therein may be made without the exercise of invention and within the true spirit and scope of claims hereto appended.

Figure 2:
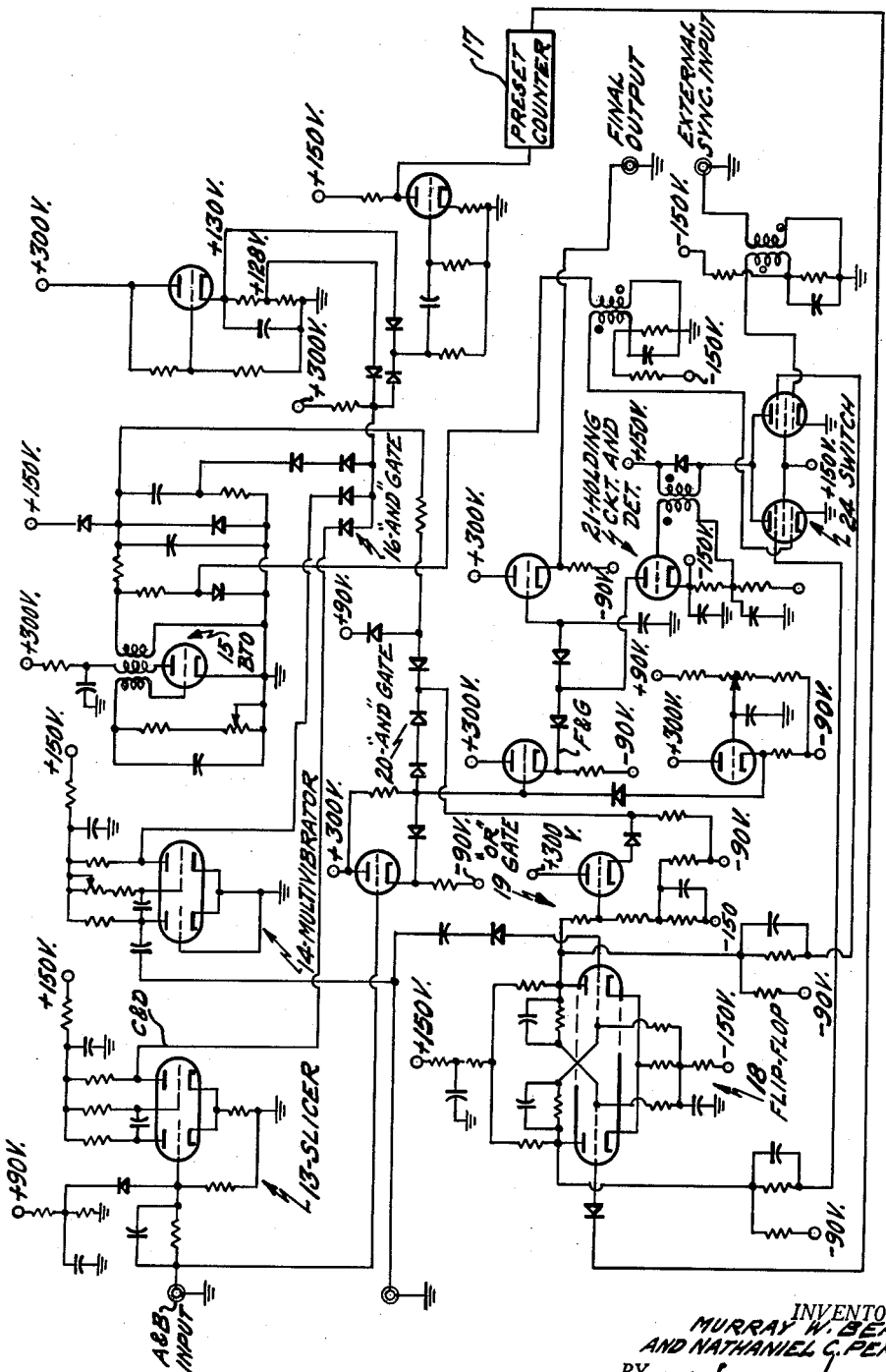
Figure 3:
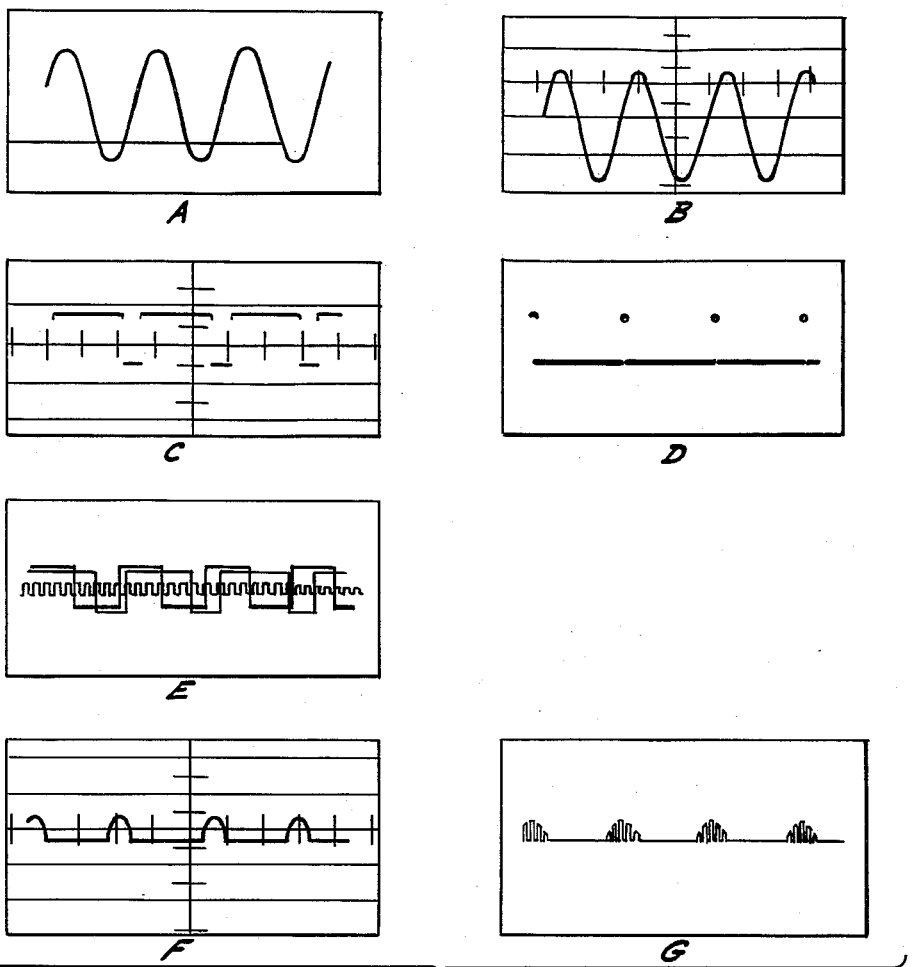
Figure 4:
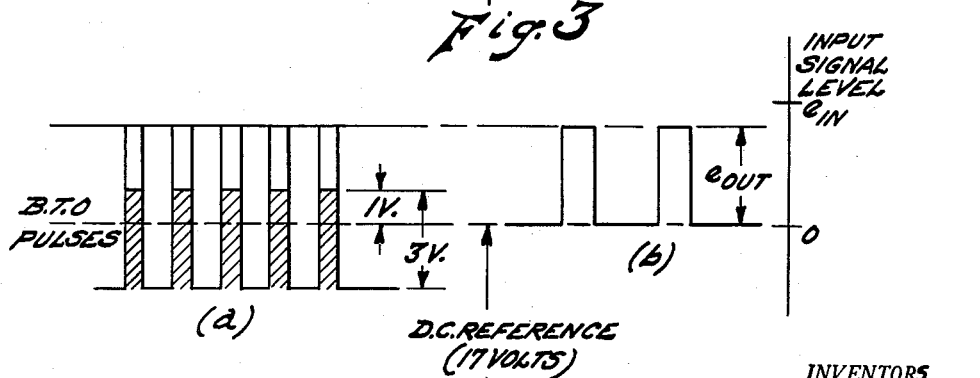
Figure 7:
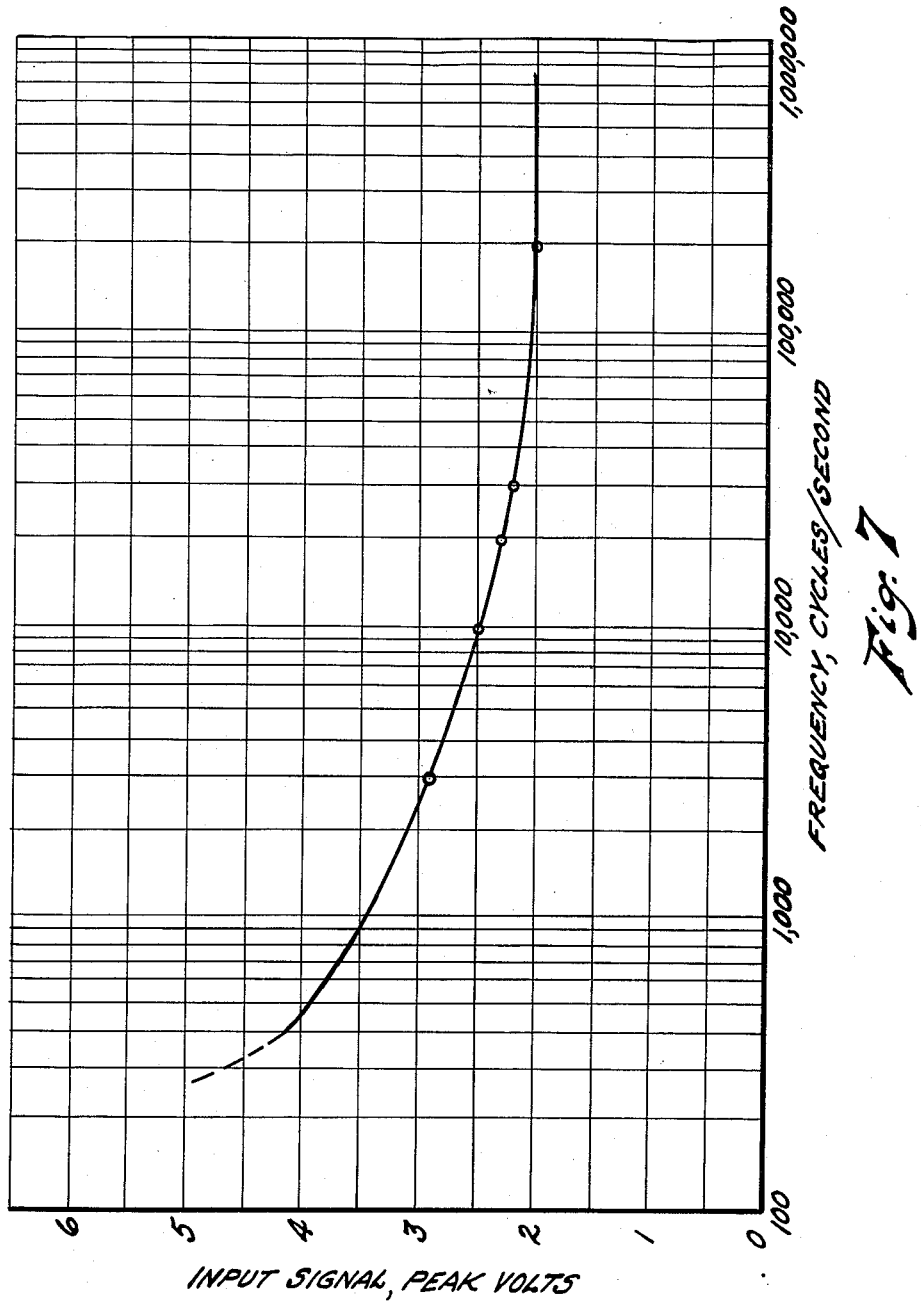

In said drawings:
FIGURE 1 is a block diagram of a modulation analyzing system assembled in accordance with the principles of our present invention;
FIGURE 2 is a diagram partly in schematic and partly in block of the major components of said system;
FIGURE 3 shows the wave shapes resulting from the major components shown in FIGURE 1 and FIGURE 2;
FIGURE 4 illustrates the output voltage levels associated with input signals;
FIGURE 5 illustrates the output vs. input linearity curves for said system and indicates the dynamic amplitude range thereof;
FIGURE 6 shows the form of output pulse from said system for a one microsecond input pulse; and
FIGURE 7 illustrates in chart form the sensitivity of the slicer included in said system.

Referring now in detail to the aforesaid embodiment of our present invention, with particular reference to the block diagram of FIGURE 1 and the wave shapes shown in FIGURE 3, the numeral 12 designates the input terminal utilized to accept the input electrical signal to be modulation analyzed. The input is detected by a receiver and is then applied in video form from terminal 12 to slicer 13. Slicer 13 is set to fire at a predetermined threshold.

Waveforms C and D in FIGURE 3 refer, respectively, to waveforms A and B thereof. These waveforms illustrate the effect of different slicer threshold levels on an input CW signal.

The output signal from slicer 13 is a fixed amplitude signal whose pulse width represents the time that the input signal applied thereto is above the preselected threshold and is illustrated in FIGURE 3 by waveform C and D for CW-amplitude and pulse modulated signals respectively.

The sampling time interval is generated by monostable multivibrator 14 which is switched on automatically by the use of negative read pulses applied to terminal 11. The gate supplied by multivibrator 14 selects a fixed portion of the system input signal in order to determine if said signal is CW or pulsed. Blocking oscillator 15 is a free running sampler that can be adjusted for 2 kc. p.s. to 20 kc. p.s. pulse rates.

Triple coincidence is performed with slicer 13, multivibrator 14, and blocking oscillator 15 signals being applied to AND circuit 16 in order to yield a pulse count proportional to the time the input signal lies above the preselected threshold. This count is fed into five stage binary counter 17 whose output signal indicates any number from one to thirty-two. It is the number associated with the duty ratio of the unknown input system signal, and therefore indicates whether the signal is CW or pulse modulated. The preset number is determined by practical considerations. The waveform shown at E of FIGURE 3 illustrates the aforementioned triple coincidence. A reset pulse for counter 17 is provided by way of terminal 11.

When the preset number is reached within the predetermined sampling time interval (multivibrator 14 gate), the output signal of counter 17 triggers storing unit 18, a bistable multivibrator, which indicates that the system input signal is CW modulated. The output signal of the bistable multivibrator is fed into OR x-tal gate 19 along with pulses from blocking oscillator 15. The output of OR gate 19 is then fed into AND (coincidence) gate 20 along with the system input signal from terminal 12. When the stored information indicates the presence of a pulsed signal, the output of AND (coincidence) gate 20 is the actual video signal. For CW signals, the output is comprised of a pulse train at the rate of blocking oscillator 15.

Holding circuit and peak detector 21 holds the peak value of the pulsed signal output therefrom. It is discharged at a time instant by the external synchronizing pulse provided by way of input terminal 10 or by the negative going pulse from blocking oscillator 15 when the system input signal is determined as CW. When the external synchronizing pulse from terminal 10 applied to terminal 22 of electronic switch 24 coincides with the pulse applied to terminal 25 from storing unit 18, an output signal is provided by way of terminal 26 to holding circuit and peak detector 21. When a pulse from blocking oscillator 15 applied to terminal 23 of electronic switch 24 coincides with a pulse applied to terminal 27 from storing unit 18, an output signal is delivered therefrom to holding, circuit and peak detector 21. The modulation analyzing system output pulse signal is provided by way of terminal 28. Each output pulse therefrom is illustrated in FIGURE 6.

Now referring to FIGURE 2, there is shown all the components of FIGURE 1 in schematic form except for preset counter 17 which is shown in block form circuit. Points A, B, C, D, E, F, and G on block diagram of FIGURE 1 are identical to the ones shown in FIGURE 2 and at these points appear the waveforms illustrated at A, B, C, D, E, F, and G, respectively, of FIGURE 3.

The "Output Against Input Linearity" wave for the modulation analyzer system, as represented by FIGURES 1 and 2, is illustrated by FIGURE 5 and indicates the dynamic amplitude range thereof. The low signal level end is limited to 3 volts. This voltage represents feed-through of the blocking oscillator pulses in the output coincidence gate. However, by carefully selecting an output direct current reference voltage for zero input signal, the effective feed-through is reduced to one volt.

FIGURE 4 illustrates the system output voltage levels referred to the system input signal. FIGURE 4a illustrates the condition in which the input system signal is a pulse input and 4b, a continuous wave input. The cross-hatched pulse of FIGURE 4a represents feed-through for zero input signal.

Low level signals are also limited by the sensitivity of slicer 13 shown in FIGURE 1. The slicer is condenser coupled and has a sensitivity which decreases at low frequencies as illustrated in the graph of FIGURE 7. For signal frequencies below 300 cycles per second an oscillation appears at the trailing edge of the slicer output pulse. However, the probability of a signal input less than 400 cycles per second is small.

We claim:

1. A modulation analyzer system for determination of the modulation content of electrical video signals applied thereto, comprising amplifying means receiving said electrical signal and producing an output signal having a fixed amplitude with a pulse width which represents the time said electrical video signal is above a preselected threshold value, gating means to select a fixed portion of said electrical video signal, means to sample said electrical video signal at a preselected repetition rate, means to perform triple coincidence occurring in said signals received from said amplifying means, said gating means, and said sampling means, preset counting means adapted to receive the output signal from said triple coincidence means and operating to produce an output signal therefrom when the preset number therein is reached within a predetermined time interval, bistable multivibrator means triggered by said preset counter output signal, OR gate means receiving the output signals from said bistable multivibrator means and said sampling means, AND gate means receiving the output signal from said OR gate means and also said electrical video signal, and means to hold the peak value of the pulsed signal output from said AND gate means, said peak value pulsed signal output being discharge at a time instant indicated by an external synchronizing pulse.

2. A modulation analyzer system for determination of the modulation content of an electrical video signal applied thereto, comprising means to convert said electrical video signals having continuous wave modulation content into pulse amplitude modulated signals having a preselected fixed pulse rate, and means to pass said electrical video signals having pulse modulation content to the output of said system in the same form as applied to said system.

3. A modulation analyzer system for determination of the modulation content of electrical video signals applied thereto comprising means to pass said electrical video signals having pulse modulation content to the output of said system in the same form as applied to said system, means to convert said electrical video signals having continuous wave modulation content to pulse modulated signals having a preselected fixed pulse rate differing from said pulse modulated electrical video signals, and means to store the pulse peaks of said signals for a period of time determined by an external synchronizing pulse.

4. A modulation analyzer system for determination of the modulation content of electrical video signals applied thereto comprising means to identify said electrical video signals having pulse modulation content, means to pass said pulse modulated electrical video signal to the output of said system in the same form as received upon said identification, and means to convert said electrical signals having continuous wave content into pulse modulated signals having a preselected pulse rate differing from said pulse modulated electrical video signals.

5. A modulation analyzer system for determination of the modulation content of electrical video signals applied thereto, comprising amplifying means receiving said electrical signal and producing an output signal having a fixed amplitude with a pulse width representing the time said electrical video signals are above a preselected threshold level, gating means to select a fixed portion of said electrical video signals, means to sample said electrical video signals at a preselected repetition rate, means to perform triple coincidence occurring in said signals received from said amplifying means, said gating means, and said sampling means, preset counting means adapted to receive the output signal from said triple coincidence means and operating to produce an output signal therefrom when the preset number therein arrives at a predetermined time interval, bistable multivibrator means triggered by a signal received from said preset counter, OR gate means receiving simultaneously a signal from said bistable multivibrator and said sampling means, and AND gate means responsive to a signal from said OR gate means and said electrical video signal.

No references cited.